United States Patent [19]

Keren-Zvi et al.

[11] Patent Number: 4,984,240
[45] Date of Patent: Jan. 8, 1991

[54] DISTRIBUTED SWITCHING ARCHITECTURE FOR COMMUNICATION MODULE REDUNDANCY

[75] Inventors: Joseph Keren-Zvi, Sharon; Wayne M. King, Canton, both of Mass.

[73] Assignee: Codex Corporation, Mansfield, Mass.

[21] Appl. No.: 288,788

[22] Filed: Dec. 22, 1988

[51] Int. Cl.$^5$ .............................................. G06F 11/20
[52] U.S. Cl. ...................................... 371/8.2; 364/187; 340/825.01
[58] Field of Search ................ 371/8.2, 8.1, 9.1, 11.2, 371/11.1, 68.2, 68.3, 68.1; 364/187, 200 MS File, 900 MS File; 370/13, 16, 16.1; 375/10; 340/825.16, 825.01, 825.05, 825.08

[56] References Cited

U.S. PATENT DOCUMENTS

| | | | |
|---|---|---|---|
| 4,141,066 | 2/1979 | Keiles | 371/9.1 X |
| 4,228,496 | 10/1980 | Katzman et al. | 364/200 |
| 4,356,546 | 10/1982 | Whiteside | 364/200 |
| 4,486,829 | 12/1984 | Mori | 364/200 |
| 4,623,883 | 11/1986 | Konen | 364/187 X |
| 4,628,508 | 12/1986 | Sager | 364/187 X |
| 4,774,709 | 9/1988 | Tulpule | 371/11.2 |

OTHER PUBLICATIONS

Starpoint D6000 Digital Microwave Radio, 5/3/85, pp. 1–8.
Codex, Hardware Description for Project 6290, pp. 2–6, 2–7.

Primary Examiner—Jerry Smith
Assistant Examiner—Robert W. Beausoliel
Attorney, Agent, or Firm—Fish & Richardson

[57] ABSTRACT

Partner modules are assigned to a plurality of primary modules in a communications system, each partner module being adapted to route signals from the primary module to which it is assigned to a spare module in case the primary module fails. The partner modules preferably also serve as primary modules for receiving signals from their associated communication lines. As a result, redundancy for a failed primary module is provided by a signal routing architecture that is distributed throughout the communications system.

21 Claims, 3 Drawing Sheets

DISTRIBUTED SWITCHING ARCHITECTURE FOR COMMUNICATION MODULE REDUNDANCY

BACKGROUND OF THE INVENTION

This invention relates to communications systems that provide a redundant module for interfacing with communication lines in case of failure of a primary interface module.

Conventional communications systems (e.g., telecommunications systems) typically include multiple communication lines that are connected to corresponding primary interface modules for receiving data on the lines. The interface modules are "field replaceable" for servicing and/or replacement in case of failure. The communications system also includes one or more spare (i.e., redundant) modules for connection to the appropriate communication lines in case of failure or servicing of a primary interface module. One known scheme for providing this redundancy uses a dedicated switching module or subsystem to detect the failure of a primary module and connect the spare module in its place to the corresponding communication line.

SUMMARY OF THE INVENTION

A general aspect of the invention is assigning partner modules to a plurality of primary modules in a communications system, each partner module being adapted to route signals from the primary module to which it is assigned to a spare module in case the primary module fails. The partner modules preferably also serve as primary modules for receiving signals from their associated communication lines.

As a result, redundancy for a failed primary module is provided by a signal routing architecture that is distributed throughout the communications system, eliminating the need for an additional dedicated switching module or subsystem. The distributed nature of the routing architecture permits the redundancy to be implemented in the same way in both large communications systems (i.e., systems having many interface modules) and small systems.

Preferred embodiments include the following features.

In one embodiment, the primary modules are arranged in pairs, and each module in each pair of modules serves as the partner module for the other module in the pair. Each primary module may be paired with another primary module. Alternatively, one of the primary modules may be paired with the spare module, which then serves as the partner module for that primary module.

In another embodiment, the primary modules and the spare module are arranged in a loop such that each one of the modules serves as the partner module for an adjacent module in the loop.

Each partner module couples signals from the communication line of the associated primary module onto a signal bus if that primary module fails, and the spare module receives the signals from the signal bus. A primary module which also serves as a partner module has a first input coupled to its communication line, and has a second input coupled to the communication line of the primary module with which it is partnered for routing signals from the communication line of that primary module onto the signal bus if the primary module fails.

When the spare module serves as the partner of one of the primary modules, the spare module has a first input coupled to the signal bus, and a second input of the spare is coupled to the communication line of the primary module with which the spare is partnered for routing signals from the communication line onto the signal bus (and back to the spare module) if the primary module fails.

In yet another embodiment, the primary modules also transmit signals on a second plurality of communication lines, and each partner module couples the spare module to the second communication line of the primary module to which the partner module is assigned in case such primary module fails.

Each partner module also detects whether the primary module with which it is partnered has failed, such as by periodically polling, and being polled by, that primary module. Each partner module stores operation configuration information for the primary module with which it is partnered and notifies the spare module of the configuration information when the primary module fails. In response, the spare module assumes the configuration of the failed primary module.

Other features and advantages of the invention will be apparent from the following description of the preferred embodiments, and from the claims.

DESCRIPTION OF THE PREFERRED EMBODIMENTS

We first briefly describe the drawings.

STRUCTURE AND OPERATIONS

Figure 1:
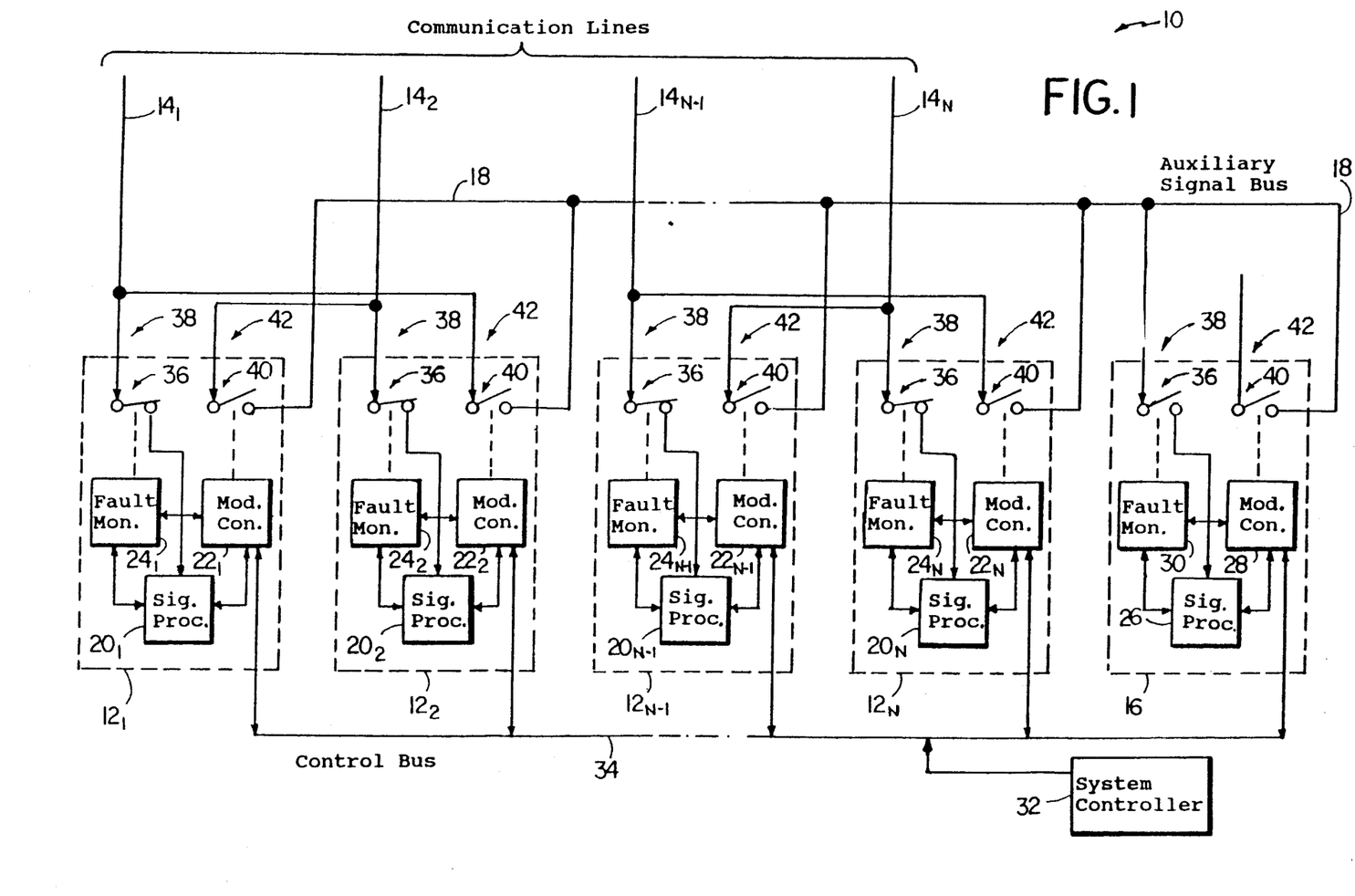
FIG. 1 is a block diagram of a communications system according to a first embodiment of the invention.

Referring to FIG. 1, communications system 10 includes N replaceable primary interface modules $12_1$–$12_N$ for receiving and processing signals (i.e., data) on N corresponding communication lines $14_1$–$14_N$. Spare (i.e., redundant) interface module 16 normally does not receive signals on any communication line $14_1$–$14_N$, but may be connected via auxiliary signal bus 18 in a manner described in detail 10 below to any communication line $14_1$–$14_N$ in case of failure (or removal) of the corresponding interface module $12_1$–$12_N$.

Interface modules $12_1$–$12_N$ include signal processors $20_1$–$20_N$, respectively, for processing the received signals. Module controllers $22_1$–$22_N$ control the operation of respective signal processors $20_1$–$20_N$. Fault monitors $24_1$–$24_N$ monitor the operation of respective signal processors $20_1$–$20_N$ and module controllers $22_1$–$22_N$. Each fault monitor has a pass state and a fail state as discussed in detail below. Module controllers $22_1$–$22_N$ operate with fault monitors $24_1$–$24_N$ in a manner described in detail below to determine whether signal processors $20_1$–$20_N$ are operating properly or have failed. Spare module 16 is identical to modules $12_1$–$12_N$ and includes processor 26, module controller 28, and fault monitor 30. Module controllers $22_1$–$22_N$, 28 communicate with each other and with a system controller 32 over control bus 34.

Each module $12_1$–$12_N$ is assigned a partner module for detecting the failure or removal of the module $12_1$–$12_N$ to which the partner is assigned and for diverting signals from the failed/removed module's communication line to spare interface module 16 via auxiliary signal bus 18. In communications system 10, modules $12_1$–$12_N$ are arranged in pairs. For example, modules $12_1$–$12_2$ comprise one pair, modules $12_{N-1}$, $12_N$ another. Each module in each pair serves as the partner module for the other module in the pair. Thus, module $12_2$, besides receiving and processing signals on communication line $14_2$, serves as the partner of module $12_1$. Likewise, module $12_1$ is assigned as the partner to module $12_2$. 10 Each interface module $12_1$–$12_N$, 16 (e.g., module $12_1$) includes primary switch 36 for selectively coupling signals applied to primary module input 38 to that module s signal processor (e.g., signal processor $20_1$) under the control of the fault monitor (e.g., fault monitor $24_1$) of the module. A secondary switch 40 in each module $12_1$–$12_N$, 16 (e.g., module $12_1$) selectively couples signals present at the secondary input 42 of that module onto auxiliary bus 18 under the control of the module controller of the module (e.g., module controller $22_1$). Primary switches 36 of modules $12_1$–$12_N$ are normally closed to couple signals on communication lines $14_1$–$12_N$ to respective signal processors $20_1$–$20_N$; secondary switches 40 in modules $12_1$–$12_N$, on the other hand, are normally open for reasons explained below. Primary and secondary switches 36, 40 in spare module 16 are operated by fault monitor 30 and module controller 28, respectively, and both are normally open.

In operation, modules $12_1$–$12_N$ receive and process signals from communication lines $14_1$–$14_N$ in a conventional manner as long as all modules $12_1$–$12_N$ are functioning normally. During normal operation, spare module 16 is idle. Each module $12_1$–$12_N$ periodically monitors (polls) its partner for faults via control bus 34 and is likewise periodically monitored (polled) for failure by its partner. For example, odd-numbered modules (e.g., modules $12_1$, $12_{N-1}$, where N is an even number) are polled by their even-numbered partners (e.g., modules $12_2$, $12_N$) and, if operating correctly, send a response to the even-numbered partners over control bus 34. An odd numbered module determines that its even-numbered partner is operating correctly if the odd-numbered module receives a poll within predetermined time interval. The even numbered module determines that its odd numbered partner is operating properly if the even numbered module receives a response to the poll within the predetermined time interval. This procedure is repeated periodically whenever system 10 is operating.

As an example of this polling procedure, consider partner modules $12_1$, $12_2$. When system 10 is started, the module controller in one of these modules (e.g., controller $22_1$ in module $12_1$) polls partner module $12_2$ by transmitting a data sequence called a polling protocol to module controller $22_2$ If signal processor $20_2$ and module controller $22_2$ are operating properly, controller $22_2$ sends a response indicating such proper operation to module controller $22_1$. Module controller $22_2$ periodically sends a reset command to keep the fault monitor in the pass state.

Module controller $22_1$ analyzes the response to its poll from module controller $22_2$ to determine whether the response indicates that module $12_2$ is in the pass state. If so, module controller $22_1$ repeats the cycle in the same manner described above. Note that the response from module $12_2$ constitutes a "poll" of module $12_1$, the "response" to which is the next poll by module $12_1$ of module $12_2$.

Module failure can be detected in one of two ways during the polling procedure. Again using partner modules $12_1$, $12_2$ as examples, module $12_2$ is deemed to be malfunctioning if module controller $22_2$ either completely fails to respond to the polling protocol from module $12_1$ or responds with a fault status.

When signal processor $20_2$ fails to operate, fault monitor $24_2$ detects this failure and sets its status to indicate that processor $20_2$ is malfunctioning. Module controller $22_2$ learns of the failure by reading the status of fault monitor $24_2$ and sends a response to module controller $22_1$ indicating a fault status. Module controller $22_2$ also sends a set command to fault monitor $24_2$ to change its state from pass to fail and cause fault monitor $24_2$ to open primary switch 36 in module $12_2$. When module controller $22_1$ reads the response from controller $22_2$ indicating the fault, it closes the secondary switch 40 in module $12_1$. As a result, signals on line $14_2$ are diverted from failed module $12_2$, through secondary switch 40 in its partner module $12_1$, and onto auxiliary signal bus 18.

If module controller $22_2$ fails to send a reset command to fault monitor $24_2$ within a predetermined time, fault monitor $24_2$ determines that controller $22_2$ has failed and sets itself to the fault state, thereby preventing module $12_2$ from responding to subsequent polls from module controller $22_1$. Fault monitor $24_2$ then opens primary switch 36 in module $12_1$, decoupling signal processor $20_2$ from communication line $14_2$. Module controller $22_1$, upon failing to receive a response within a predetermined time interval, would determine that partner module $12_2$ is missing or severely malfunctioning, and close secondary switch 40 in module $12_1$.

When module $12_2$ has failed (or is removed) as described above, the module controller $22_1$ in its partner module $12_1$ notifies module controller 28 in spare module 16 and transmits data to module controller 28 that describes the "configuration" of signal processor $20_2$ in failed module $12_2$. Each module controller $22_1$–$22_N$ stores data that describe the configuration of the signal processor in its module and the configuration of the partner module s signal processor.

For example, module controller $22_1$ stores configuration data for signal processor $20_1$ and signal processor $20_2$, and module controller $22_2$ likewise stores data on the configurations of signal processors $20_1$, $20_2$. The configuration data for a given signal processor (e.g., signal processor $20_2$) includes information identifying the interface with the module s communication line $14_2$, the type of process being run on signal processor $20_2$, and the destination in system 10 where the output of signal processor $20_2$ is to be sent over line $14_2$.

Spare module controller 28 responds to the configuration data from module controller $22_1$ by causing spare signal processor 26 to assume the specified configuration and by resetting the response timer in spare fault monitor 30. Primary switch 36 in spare module 16 is then closed by fault monitor 36, thereby completing the rerouting of signals on communication line $14_2$ to spare signal processor 26 via auxiliary signal bus 18 without any interruption in service.

The rerouting operation is the same regardless of which module in which pair of modules fails. For example, if module $12_N$ fails, fault monitor $24_N$ opens primary switch 36 in module $12_N$, and module controller $22_{N-1}$ closes secondary switch 40 in module $12_{N-1}$. Module controller $22_{N-1}$ sends the configuration data of signal processor $20_N$ to spare module controller 28, which causes spare signal processor 26 to assume that configuration and causes spare fault monitor 30 to close primary switch 36. Data on line $14_N$ is thereby routed via partner module $12_{N-1}$ and auxiliary signal bus 18 to signal processor 26 in spare module 16.

Other embodiments are within the following claims.

For example, the number, N, of interface modules $12_1$–$12_N$ may be odd rather than even. In this case, spare module 16 would also serve as the partner module for the module not otherwise paired (e.g., module $12_N$). The secondary input 42 of spare module 16 is connected to communication line $14_N$ (see FIG. 2). Spare module 16 would poll partner module $12_N$ in the same manner as discussed above. If module controllers $22_N$, 28 determine that signal processor $20_N$ has failed, spare module controller 28 closes secondary switch 40 in spare module 16 and causes spare fault monitor 30 to close primary switch 36, and fault monitor $24_N$ causes primary switch 36 of failed module $12_N$ to open. Signals on line $14_N$ thus are coupled through switch 40 in spare module 16 onto auxiliary signal bus 18 to spare signal processor 26 via spare module switch 36. Module controller $22_N$ identifies module $12_N$ as the failed module, and spare module 16 assumes the configuration of module $12_N$ in response to the configuration data stored in spare module controller 28.

Figure 2:
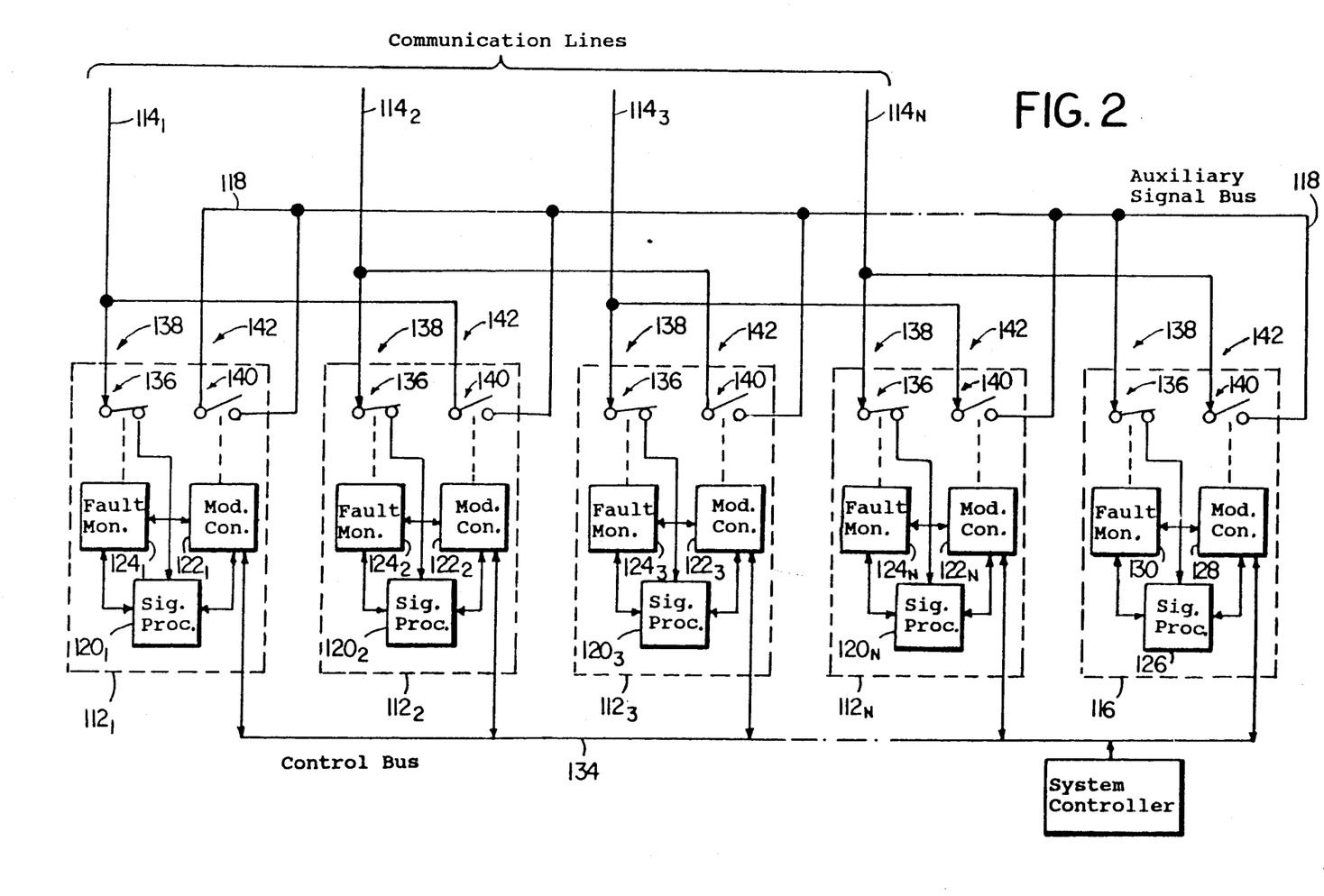
FIG. 2 is a block diagram of a communications system according to a second embodiment of the invention.

Referring to FIG. 2, the distributed switching scheme of the invention can be used with other module configurations. In communications system 100, modules $112_1$–$112_N$, which receive signals on respective communications lines $114_1$–$114_N$, are connected in a "loop" configuration with spare module 116. In this arrangement, each module is assigned to be the partner of the two modules (a "client" module and an "agent" module) disposed on each side of the partner module. An agent module controls the secondary switch 140 of its client module. For example, because module $112_2$ controls secondary switch 140 of module $112_1$, module $112_2$ is the agent of module $112_1$. The secondary switch 140 of module $112_2$ is controlled by module $112_3$, and thus module $112_2$ is the client of module $112_3$. Likewise, module $112_N$ is the agent of module $112_{N-1}$ (not shown).

The secondary input 142 of each module applies signals to secondary switch 140 from the communication line of its client module. For example, secondary switch 140 in module $112_2$ receives signals from communication line $114_1$. The outputs of all secondary switches 140 are connected to auxiliary signal bus 118. The loop is closed by connecting the primary input 138 of spare module 116 and the secondary input 142 of the first module $112_1$ in the loop to auxiliary signal bus 118. As before, during normal operation primary and secondary switches 136, 140 in modules $112_1$–$112_N$ are normally closed and open, respectively, and both switches 136, 140 in spare module 116 are open. Each module's switches are controlled by that module s fault monitor (i.e., $124_1$–$124_N$, 130) and module controller (i.e., $122_1$–$122_N$, 128) in the same manner as described above, and the agent modules poll their client modules over control bus 134 using the same procedure as discussed above.

In operation, when one of the modules (e.g., module $112_1$) indicates its failure, either by not responding to the poll from its agent module (e.g., module $112_2$) or responding with a fault status, the response timer in fault monitor $124_1$ times-out, causing fault monitor $124_1$ to open primary switch 136 of module $112_1$. Module controller $122_2$ closes secondary switch 140 of module $112_2$ and sends the configuration data of signal processor $120_1$ to module controller 128 in spare module 116. Spare module 126 configures spare signal processor 126 according to the configuration data and causes spare fault monitor 130 to close spare module primary switch 136. Secondary switch 128 in spare module 116 is maintained open. The data on communication line $114_1$. is thus routed through module $112_2$, onto auxiliary signal bus 118, and is applied to signal processor 126 in spare module 116.

Figure 3:
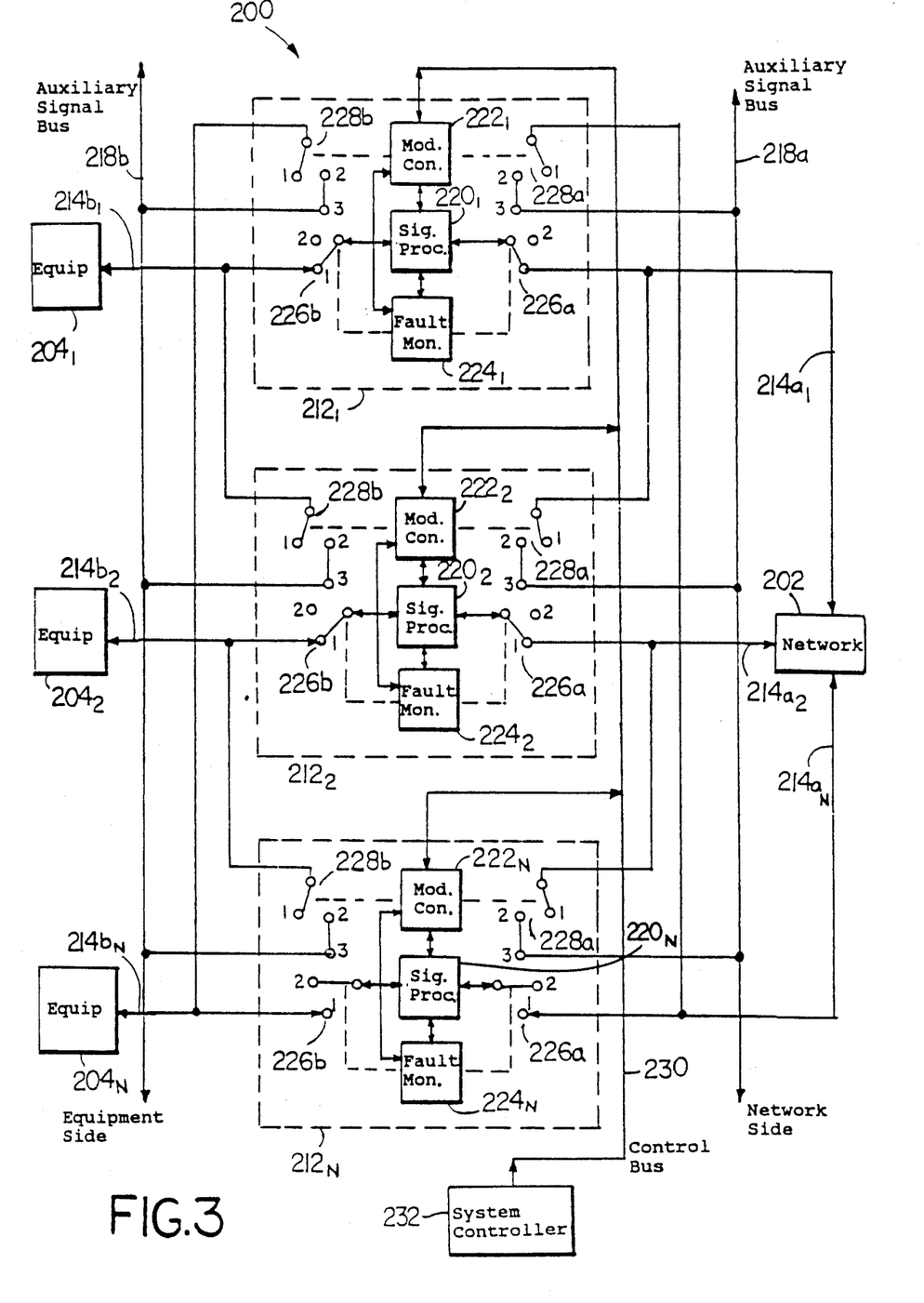
FIG. 3 is a block diagram of a communications system according to a third embodiment of the invention

Referring to FIG. 3, the distributed switching architecture of the invention can also be used in a communications system 200 in which interface modules $212_1$–$212_N$ are connected between network 202 and equipment $204_1$–$204_N$ via network lines $214a_1$–$214a_N$ and equipment lines $214b_1$–$214b_N$, respectively. The network side includes an auxiliary signal bus 218a, and a separate auxiliary signal bus 218b is provided for the equipment side of the system.

Each module $212_1$–$212_N$ includes a signal processor $220_1$–$220_N$ and two sets of primary and secondary switches; primary switch 226a and secondary switch 228a on the network side, and primary and secondary switches 226b, 228b on the equipment side. The primary switches 226a, 226b of each module (e.g., module $212_1$) are controlled by the fault monitor (e.g., fault monitor $224_1$) and the module controller (e.g.. module controller $222_1$). respectively, of that module.

Any one of interface modules $212_1$–$212_N$, for example, module $212_N$, may be arbitrarily designated as the spare module. Module controller $222_N$ and fault monitor $224_N$ in designated spare module $212_N$ normally decouple module $212_N$ from lines $214a_N$, $214b_N$ by placing its primary switches 226a, 226b in position "2". Primary switches 226a, 226b in the active modules (e.g., modules $212_1$, $212_2$) are normally in position "1" to couple signal processors $220_1$, $220_2$ of such interface modules in series with their respective communication lines (e.g., lines $214a_1$, $214b_1$ and $214a_2$, $214b_2$). Secondary switches 228a, 228b in-all modules $212_1$–$212_N$ are all normally deactivated in position "1" by module controllers $222_1$–$222_N$, respectively.

Modules $212_1$–$212_N$ are connected in a "loop" configuration, with each module serving as the agent for one adjacent module and the client for the other adjacent module. For example, module $212_2$ is the agent for module $212_1$ and is the client of module $212_3$ (not shown). Likewise, module $212_1$ serves as the agent for module $212_N$.

When an active module is removed or malfunctions (as detected by, for example, the polling procedure discussed above) the fault monitor in the malfunctioning module opens its pair of primary switches 226a, 226b, and the module controller in the failed module's agent closes the secondary switches 228a, 228b in its client module, thereby decoupling the failed client module from its equipment and network 202 and coupling the communication lines of the failed module onto auxiliary signal buses 218a, 218b.

The module controller in the agent module also notifies module controller $222_N$ in spare module $212_N$ of the failure of its client and sends the configuration of the signal processor of the failed module to spare module controller $222_N$ via control bus 230. Module controller $222_N$ configures signal processor $220_N$ accordingly and causes fault monitor $224_N$ to change switches 226a, 226b to position "3", thereby coupling signal processor $220_N$ to auxiliary signal buses 218a, 218b so that spare module $212_N$ replaces the failed module in the system.

For example, if module $212_1$ fails, the response timer in fault monitor $224_1$ times-out and fault monitor $224_1$ deactivates primary switches $226a$, $226b$ in module $212_1$ to position "2", decoupling module $212_1$ from communication lines $214a_1$, $214b_1$. Module controller $222_2$ actuates secondary switches $228a$, $226b$ in module $212_2$ to position "2", thereby coupling signals on communication lines $214a_1$, $214b_1$ onto auxiliary signal buses $218a$, $218b$, respectively. Module controller $222_2$ also sends the configuration of signal processor $220_1$ to spare module controller $222_N$ via control bus 230.

Module controller $222_N$ sets the configuration of spare signal processor $220_N$ to be the same as that of signal processor $220_1$ and causes spare fault monitor $224_N$ to change primary switches $226a$, $226b$ in spare module $212_N$ to position "3". As a result, the signals on auxiliary buses $218a$, $218b$ are coupled to signal processor $220_N$ and spare module $212_N$ is inserted between network 202 and equipment $204_1$ in place of failed module $212_1$.

We claim:

1. In a communication system of the kind in which a plurality of primary communications modules receive signals on a corresponding plurality of communication lines, apparatus for providing redundancy in case of a failure of one of said primary modules, comprising
 a spare communications module for receiving signals from the communication line corresponding to a filed primary module, and
 a plurality of partner modules assigned to said plurality of primary modules, each partner module comprising circuitry for coupling signals from the communication line of the primary module to which the partner module is assigned to said spare module in case of failure of said primary module.

2. The communications system of claim 1 wherein at least one of said primary modules also serves as the partner module of another one of said primary modules.

3. The communications system of claim 2 wherein said primary modules are arranged in pairs, each module in each pair of modules serving as the partner module for the other module in the pair.

4. The communications system of claim 3 wherein each one of the primary modules is paired with another one of the primary modules.

5. The communications system of claim 3 wherein one of said primary modules is paired with said spare module, said spare module being assigned as the partner module to said one primary module.

6. The communications system of claim 2 wherein said primary modules and said spare module are arranged in a loop such that each one of said modules serves as the partner module for an adjacent module in the loop.

7. The communications system of claim 2 further comprising
 a signal bus, the partner modules each being adapted to couple signals from the communication line of the primary module to which the partner is assigned onto the signal bus if said primary module fails, and the spare module being adapted to receive the signals from said signal bus.

8. The communication system of claim 7 wherein said at least one of said primary modules has a first input coupled to its communication line and a second input coupled to the communication line of the primary module with which it is partnered, for routing signals from the communication line of said primary module onto said signal bus if said primary module fails.

9. The communications system of claim 8 wherein said spare module is assigned as the partner of one of said primary modules, said spare module having a first input coupled to said signal bus and a second input, coupled to the communication line of said one primary module, for routing signals from said communication line onto said signal bus if said one primary module fails.

10. The communications system of claim 1 wherein said primary modules further transmit signals on a second plurality of communication lines, said spare module being adapted to transmit signals on the one of the second plurality of communication lines corresponding to the failed primary module,
 each said partner module being adapted to couple said spare module to the second communication line of the primary module to which the partner module is assigned in case of failure of said primary module.

11. The communications system of claim 1 wherein each partner module comprises circuitry for detecting whether the primary module with which it is partnered has failed.

12. The communications system of claim 11 wherein each partner module is adapted to periodically poll the primary module with which it is partnered, and to be periodically polled by said primary module, to detect whether said primary module has failed.

13. The communications system of claim 12 where each partner module includes storage for operational configuration information for the primary module with which it is partnered and further comprises circuitry for notifying said spare module of said configuration information when said primary module fails.

14. The communications system of claim 13 wherein said spare module includes means for causing said spare module to assume the configuration of said failed primary module in response to said configuration information.

15. In a communications system of the kind in which a plurality of primary communications modules receive signals on a corresponding plurality of communication lines, a method of providing redundancy in case of a failure of one of said primary modules, comprising
 providing a spare communications module for receiving signals from the communication line corresponding to a failed primary module,
 assigning partner modules to said primary modules, and
 enabling each partner module to couple signals from the communication line of the primary module to which the partner module is assigned to said spare module in case of failure of said primary module.

16. The method of claim 15 further comprising assigning at least one of said primary modules to be the partner module of another one of the primary modules.

17. In a communication system of the kind in which a plurality of primary communications modules receive signals on a corresponding plurality of communication lines, apparatus for providing redundancy in case of a failure of one of said primary modules, comprising
 a spare communications module for receiving signals from the communication line corresponding to a failed primary module, and
 at least some of said primary modules being assigned to serve as a plurality of partner modules, each partner module comprising circuitry for coupling signals from the communication line of the primary module to which the partner module is assigned to said spare module in case of failure of said primary module while said partner module continues to receive signals from its communication line.

18. In a communications system of the kind in which a plurality of primary communication modules receive signals on a corresponding plurality of communication lines, apparatus for providing redundancy in case of a failure of one of said primary modules, comprising
   a spare communications module for receiving signals from the communication line corresponding to a failed module, and
   a plurality of partner modules assigned to said plurality of primary modules, each partner module comprising circuitry for detecting whether the primary module to which said partner module is assigned has failed and, if so, coupling signals from the communication line of said primary module to said spare module.

19. In a communications system of the kind in which a plurality of primary communications modules receive signals on a corresponding plurality of communication lines, apparatus for providing redundancy in case of a failure of one of said primary modules, comprising
   a spare communications module for receiving signals from the communication line corresponding to a failed module, and
   a plurality of partner modules assigned to said plurality of primary modules, each partner module comprising circuitry for coupling signals from the communication line of primary module to which said partner module is assigned through said partner module to said spare module in case of failure of said primary module.

20. The communication system of claim 1, 17, 18, or 19 configured so that said spare module receives communication signals only from the communication line corresponding to a failed primary module.

21. The communication system of claim 1, 17, 18, or 19 including only a single said spare communications module for said plurality of primary modules.

* * * * *

UNITED STATES PATENT AND TRADEMARK OFFICE
CERTIFICATE OF CORRECTION

PATENT NO. : 4,984,240

DATED : 1/8/91

INVENTOR(S) : Joseph Keren-Zvi and Wayne M. King

It is certified that error appears in the above-identified patent and that said Letters Patent is hereby corrected as shown below:

Column 2, line 37, insert a period at the end of the line.

Column 3, line 12, delete "10" after "$12_2$" and start a new paragraph at "Each".

Column 3, line 24, "$14_1$-$12_N$" should be --$14_2$-$14_N$--.

Column 3, line 55, insert a period after "$22_2$".

Column 4, line 41, insert an apostrophe in "modules".

Column 4, line 48, insert an apostrophe in "modules".

Column 5, line 55, insert an apostrophe in "modules".

Column 6, line 6, delete "." after "$114_1$".

Column 7, line 1, delete "15" before "response".

UNITED STATES PATENT AND TRADEMARK OFFICE
CERTIFICATE OF CORRECTION

PATENT NO. : 4,984,240

DATED : 1/8/91

INVENTOR(S) : Joseph Keren-Zvi and Wayne M. King

It is certified that error appears in the above-identified patent and that said Letters Patent is hereby corrected as shown below:

Column 7, line 30, "filed" should be --failed--.

Signed and Sealed this

Sixth Day of October, 1992

*Attest:*

DOUGLAS B. COMER

*Attesting Officer*  *Acting Commissioner of Patents and Trademarks*